July 15, 1952  G. A. PARISH  2,603,023
FISHING LURE WITH CLEVIS FOR REPLACEABLE SPINNERS
Filed Feb. 25, 1950
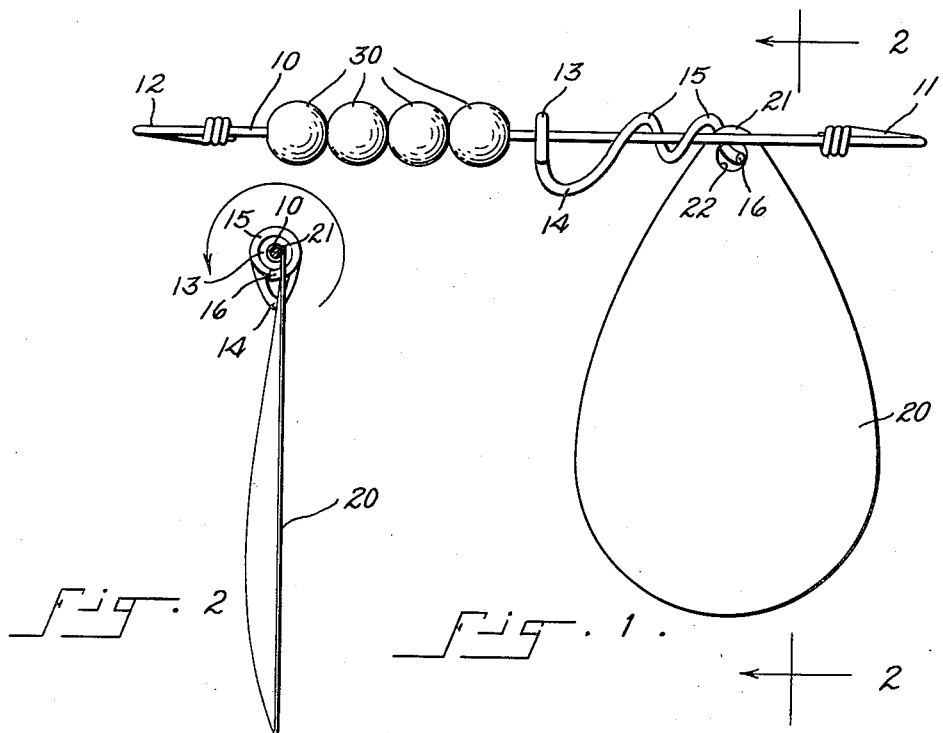
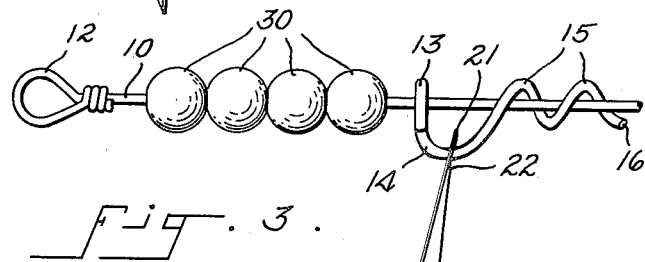
INVENTOR.
George A. Parish
BY
Buckhorn and Cheatham
Attorneys Patented July 15, 1952

2,603,023

UNITED STATES PATENT OFFICE 2,603,023

FISHING LURE WITH CLEVIS FOR REPLACEABLE SPINNERS

George A. Parish, Portland, Oreg.

Application February 25, 1950, Serial No. 146,247

1 Claim. (Cl. 43—42.19)

The present invention comprises a fishing lure having means for removable association of spinner spoons therewith whereby the user may change the size, shape or color of the spinner portion of the lure. It is well known that fish in different waters, or in the same water under different climatic conditions or at different seasons of the year, will be attracted to spinner lures of different types, but it is impractical to maintain a large collection of different types of lures and to change the entire lure until the right one is found.

Attempts have been made in the past to provide fishing lures with interchangeable spinner mounting means, but all such devices heretofore devised are impractical for one reason or another. In some a metal member must be flexed and reflexed until the metal is so weakened that the member breaks off, resulting in loss of the spinner and rendering the lure unusable.

In others a spring hook member or the like must be sprung to one side, which usually cannot be accomplished at least without great loss of time, especially during cold, rainy weather. A principal object of the present invention is to provide a spinner attaching clevis which need not be flexed, bent or otherwise distorted in order to permit association and removal of interchangeable spinner members.

A further object of the present invention is to provide a device of the foregoing character which is made of inexpensive material and may be readily formed and associated with the lure body, thereby providing a lure capable of competing with other lures having permanently attached spinner members.

The foregoing and other objects and advantages of the present invention will be more readily ascertained from inspection of the following specification taken in connection with the accompanying drawing wherein like numerals refer to like parts throughout, while the features of novelty will be more distinctly pointed out in the appended claim.

In the drawing,

Fig. 1 is a side elevation of a lure formed in accordance with the present invention, showing a spinner at the commencement of association thereof with the lure body;

Fig. 2 is a vertical section taken substantially along line 2—2 of Fig. 1; and

Fig. 3 is a partial view of the lure showing the spinner in position of use.

The lure of the present invention comprises a shaft 10 preferably formed of relatively stiff spring wire, both ends of the shaft being bent upon themselves to provide eyes 11 and 12, the ends of the wire being wrapped about the shaft to provide abutments. The eye 11 constitutes a line attaching eye with which may be associated a split ring in order to permit use of a swivel to prevent twisting of the line, as is well known. The eye 12 constitutes a hook attaching eye with which may be associated a split ring for mounting plain hooks, feathered jigs, or the like, in accordance with the desires of the fisherman. It is, of course, to be appreciated that the lure could be supplied with a swivel permanently associated with one of the eyes and a hook or the like permanently associated with the other of the eyes, without departing from my invention.

A spinner attaching clevis formed in accordance with my invention is rotatably and slidably mounted on the wire shaft 10 and permanently retained thereon by the line attaching means. The clevis comprises a short length of wire having one end formed into an eye 13 closely encircling the shaft 10, an intermediate portion forming an outwardly projecting bight 14, and an opposite end portion comprising an open helix having several substantially uniform convolutions 15 embracing the wire shaft, the helix terminating in a free end 16. The helix is of greater internal diameter than the diameter of the shaft 10 so that the tip of a leaf-type spinner member may be inserted between the convolutions and the shaft, as seen in Figs. 1 and 2. The spinner member 20 may be of any desired configuration, or color, provided it has a relatively narrow end 21 capable of entering the spaces between the convolutions 15 and the shaft 10, the narrow end being provided with an aperture 22 of considerably larger diameter than the diameter of the wire forming the clevis.

In mounting a spinner member upon the lure, the end 16 of the clevis is passed through the aperture 22 and relative rotation of the clevis and the spinner member in one direction is then brought about. The spinner may be held in the hand and the clevis rotated by employing the bight 14 as a crank, or the bight 14 may be grasped between the fingers to immobilize the clevis while the spinner is rotated about the shaft 10. Such relative rotation of the clevis and the spinner causes longitudinal movement of the spinner end 21 onto the bight portion 14, further movement being prevented by the eye 13. During use of the lure the clevis and the spinner may rotate about the shaft as a unit, rotation being facilitated by antifriction means imposed between the eye 12 and the eye 13. Such antifriction means preferably assumes the form of a plurality of colored beads 30 strung on the shaft 10, the beads holding the spinner from entanglement with the hook and also adding to the attractiveness of the lure.

It is to be noted that the open helix comprises several turns of substantially uniform diameter, the internal diameter of said helix being considerably larger than the diameter of the wire shaft, and that the bight has a depth greater than the radius of the helix. Also, the shortest distance from the opening in the spinner to the edge of the narrow end is at least as great as the radius of said helix. By reason of these relationships, the spinner must be held flat by the user against the shaft in order that it may traverse the helix, but the spinner may freely flutter when it is engaged with the intermediate, bight-forming portion. By reason of this construction, the spinner is positively retained during usage, since it is impossible for accidental dislodgement of the spinner to occur, intelligent manipulation being required to remove the spinner from the clevis.

Having illustrated and described a preferred embodiment of my invention, it should be apparent to those skilled in the art that the invention permits of modification in arrangement and detail. I claim as my invention all such modifications as come within the true spirit and scope of the appended claim.

I claim:

In a fishing lure comprising a wire shaft provided with attaching means at both ends, the invention comprising a spinner-attaching clevis loosely mounted upon said shaft and retained thereon by said attaching means, said clevis consisting of a length of wire having one end formed into an eye rotatably and slidably engaging said wire shaft, an intermediate portion forming a bight, and the remainder formed into an open helix having several turns of substantially uniform diameter passing about said wire shaft, the internal diameter of said helix being considerably larger than the diameter of said wire shaft and said bight having a depth greater than the radius of the helix, and a leaf-type spinner removably associated with said clevis, said spinner having a relatively narrow end provided with an aperture closely adjacent the tip thereof, said aperture being of a size to permit entry of the free end of said helix whereupon relative rotation by the user of said clevis and said spinner in one direction causes relative longitudinal movement of said narrow end of the spinner onto said intermediate bight-forming portion.

GEORGE A. PARISH.

REFERENCES CITED

The following references are of record in the file of this patent:

UNITED STATES PATENTS

| Number | Name | Date |
|---|---|---|
| 103,645 | Muscroft | May 31, 1870 |
| 1,611,308 | Gicker | Dec. 21, 1926 |
| 1,698,193 | Geer | Jan. 8, 1929 |
| 1,780,184 | Gleason | Nov. 4, 1930 |
| 2,478,184 | Elliott | Aug. 9, 1949 |
| 2,486,635 | Coats | Nov. 1, 1949 |